Dec. 30, 1930.   G. R. HOFFMAN   1,787,377
BRAKING MECHANISM FOR AUTOMOBILES AND OTHER
MOTOR OR POWER DRIVEN VEHICLES
Filed March 8, 1928    2 Sheets-Sheet 1
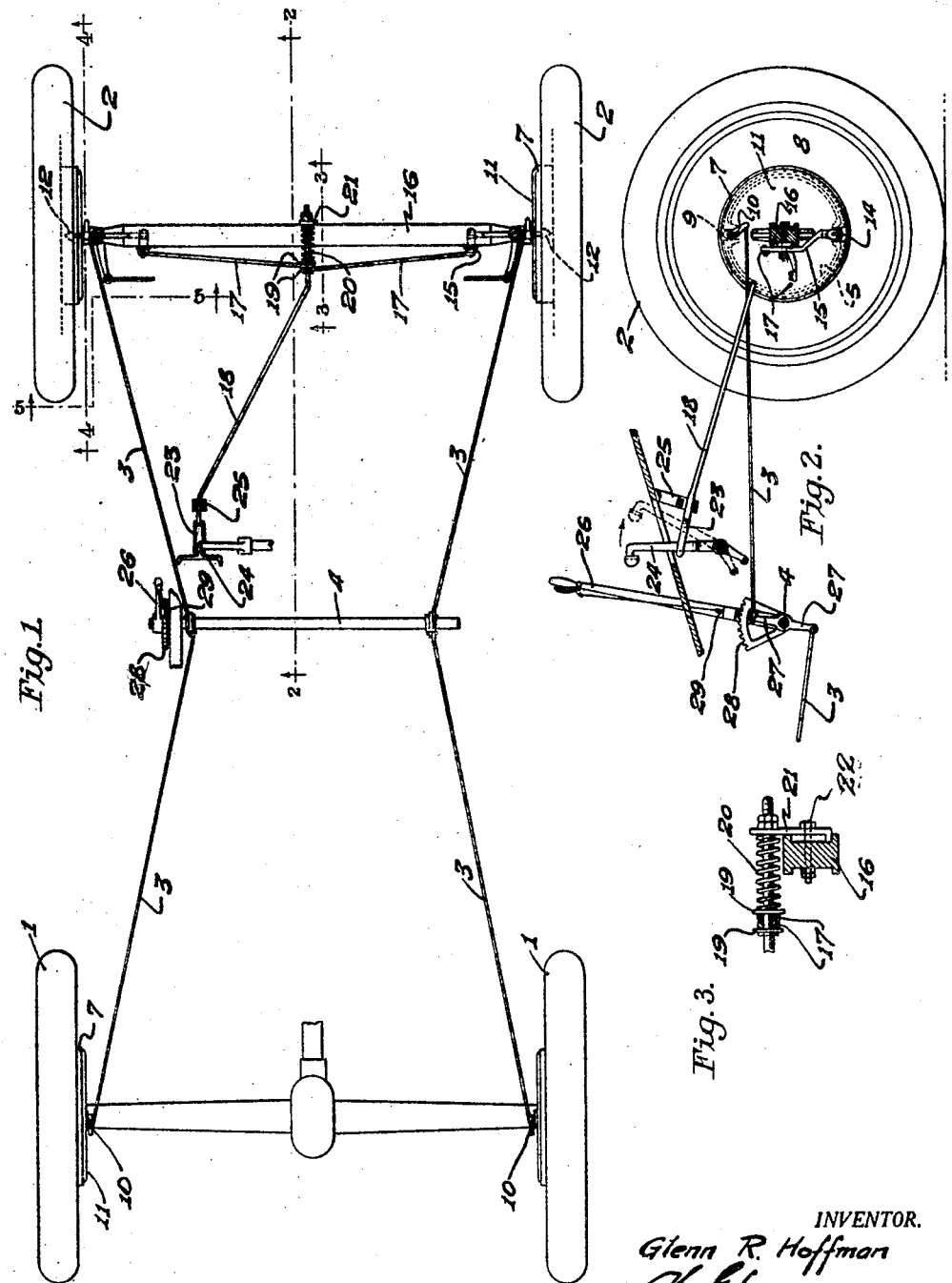
INVENTOR.
Glenn R. Hoffman
BY
ATTORNEY.

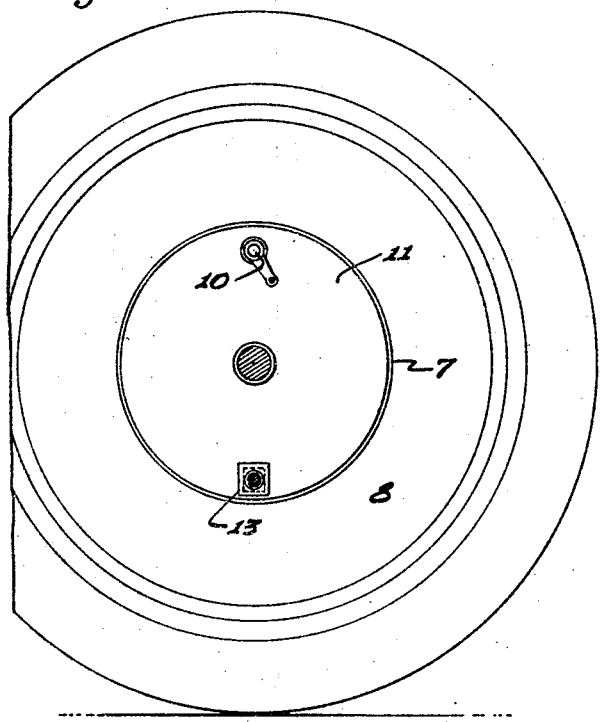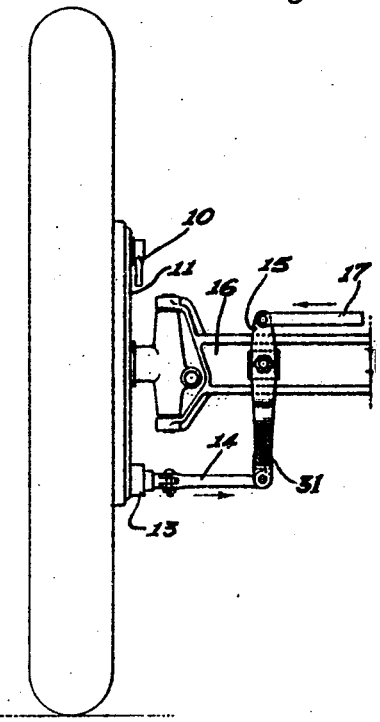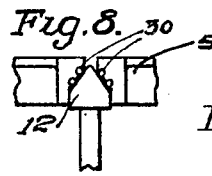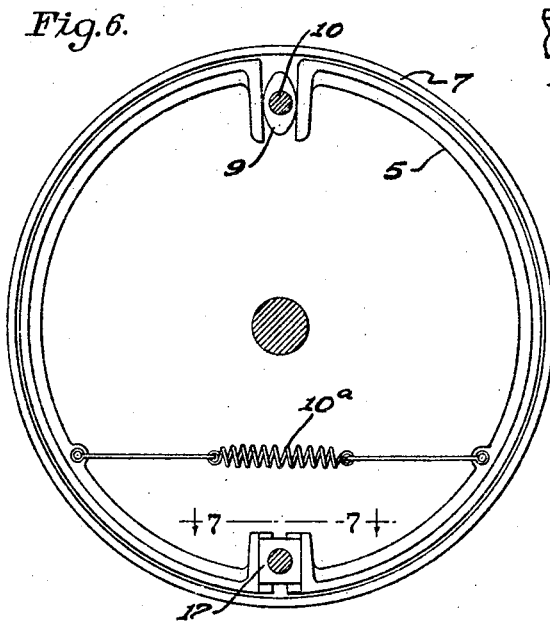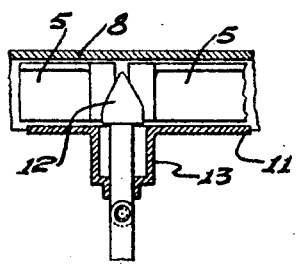

Patented Dec. 30, 1930

1,787,377

UNITED STATES PATENT OFFICE

GLENN R. HOFFMAN, OF EAST ST. LOUIS, ILLINOIS, ASSIGNOR TO HOFFMAN-PAULDING COMPANY, OF DETROIT, MICHIGAN, A CORPORATION OF MICHIGAN

BRAKING MECHANISM FOR AUTOMOBILES AND OTHER MOTOR OR POWER DRIVEN VEHICLES

Application filed March 8, 1928. Serial No. 260,028.

My invention relates to braking mechanism for automobiles and other motor or power-driven vehicles. It more particularly has reference to vehicles employing four-wheel brakes. In motor vehicles of that type with the brakes of all four wheels applied, the vehicle is liable to skid, especially when the brakes are suddenly and quickly applied because the front or steering wheels are held rigidly and consequently do not respond to the steering mechanism, with the result that collision with another vehicle or obstruction in the path of the vehicle is likely to occur inasmuch as the vehicle in which the brakes are applied cannot be steered to the right or left with the car in motion and hence the car is not under free control of the driver in seeking to avoid collision. If, however, the brakes to the front or steering wheels of the vehicle or car can be promptly released, and the brakes to the rear wheels still be held applied, the driver is given such control over the vehicle that he is enabled to steer the vehicle so as to avoid skidding of the car and also to steer the car so as to reduce the danger of collision to the minimum, if not completely avoid collision. With that object in view the invention contemplates the provision of means for promptly releasing the brakes of the front or steering wheels without the necessity of releasing the brakes of all four wheels of the car or vehicle. The invention is not limited in its scope to any particular type of car or vehicle having four wheel braking mechanism, but as one illustration of application of the invention I have selected a car or automobile of the type having four wheel brakes with my attachment applied thereto.

In the accompanying drawing,

Figure 1 is a plan view of so much of a chassis of a four wheel brake mechanism as necessary to give an illustration of one form of the present invention;

Figure 2 is a view of a detail on line 2—2 of Figure 1, looking in the direction of the arrows;

Figure 3 is a detail on the line 3—3 of Figure 1, looking in the direction of the arrows;

Figure 4 is a side view, enlarged scale, of one of the front steering wheels of a car;

Figure 5 is an elevation of a part of the front axle of a car and one wheel, and showing a portion of the front wheel brake-releasing mechanism;

Figure 6 is a side view of one of the front wheels, showing a brake-shoe or band applied internally of the brake-drum;

Figure 7 is a detail view, partly in section, on the line 7—7 of Figure 6, looking in the direction of the arrows;

Figure 8 is a sectional plan, showing antifriction or ball bearings applied to the cone that holds the brake-shoe or band in normal position and serves to release the brake-shoe or band of the steering wheels in an emergency.

In the drawing, the numeral 1 designates the rear wheels and 2 the front or steering wheels of an automobile or motor car. The numeral 3 designates brake rods extending from a rocking shaft 4 to the brake bands or shoes 5 of the four wheels. These shoes may be of a two-part type illustrated in Figure 6 which act against the inner face of the peripheral flange 7 of the wheel drum 8 when spread by a cam 9 on a crank shaft 10 passing through a stationary disk or plate 11 and actuated through the brake rods, and contracted by a spring 10a to release the brakes when the spreading cams 9 are moved to proper position, as usual in brake-shoes of such type. In the present instance, two of the parts of the brake-shoes 5 are fulcrumed or have a bearing at one end on a tapering or cone-shaped slidable member or cam 12 fitting in a correspondingly shaped recess formed in the ends of the two parts of the brake-shoe adjacent thereto as shown in Figure 7. The brake-shoe of each of the front wheels is formed as described and each is provided with the slidable cone-shaped member or cam 12. The stem of each cam passes through a housing 13, and by a link 14 connected with a rocking lever 15 which is mounted on the front axle 16 and pivotally connected at one end to a link or rod 17, the adjacent ends of the two rods being freely connected to an actuating rod 18 and held thereto, say by washers 19, a compression spring 20 encircling the rod 18 between one of the washers 19 and a plate 21 secured by a bolt 22, or otherwise, to the axle 16 and in which the rod 18 has play. The other end of rod 18 is suitably connected, say by a loop 23, or otherwise, with a foot pedal or lever 24 of the clutch of the driving mechanism or gear-drive of the car. The rod 18 may pass through a hanger 25 supported from the car floor and by it be guided in its movements. When the clutch lever is moved, say in position to release the clutch, the rod 18 will spread the links 17 so as to rock the levers 15 and retract the cone-shaped cams 12 so as to release their pressure on the adjacent ends of the brake-shoes 5 and permit the spring 10a to release the brake-shoes of the two front wheels from braking contact with the flanges of the wheel drums 8 even though the other cams of the brake-shoes remain in their set or braking position to which they were moved by the brake-rods which simultaneously act on the brakes of the four wheels. Thus it will appear that when the brakes of all four wheels have been set to brake the four wheels, the front or steering wheels of the car may be unbraked or released without releasing the brakes of the two rear wheels, so that the safety afforded by braking the car through the two rear wheels is maintained while at the same time the brakes of the two front wheels are released and the driver is able to steer the car with quickness and complete control under emergencies requiring quick action in order to avoid skidding and collisions, and yet all the advantages of four-wheel brakes for quick brake applications, especially in straight road-running are retained. When the clutch is moved to unclutching position as indicated by dotted lines of pedal 24 in Fig. 2 of the drawing and for releasing the front wheel brakes, the spring 20 is compressed and when the clutch is thrown in the recoil of spring 20 will restore rod 18 to normal position and through rods 17 throw cams 12 so that the brake-shoes of the front wheels will be positioned for normal operation under the influence of spreading cams 9 and the brake operating rods 3 for all four brakes. The brake rods 3 are operated by suitable means, say by the lever 26 connected to the rocking shaft 4 and its cranks 27 to which the brake rods are connected, and the brake rods may be held to their adjusted positions by the toothed segment 28 and locking pawl or dog 29.

The anti-friction rolls 30 shown in Figure 8 of the drawing tend to prevent cam 12 from sticking in being retracted.

The threaded bolt 31 shown in Figure 5 as entering rocking lever 15 from below permits of adjustment if from any cause it should be necessary to ease up the link 14 in its movements.

For illustrative purposes a two-part brake-band or brake-shoe has been selected but the invention is not limited to any particular type or construction of brake-band or brake-shoe. It is intended to include any construction of band or shoe with which it is adapted to be used. The designation "motor-driven" as used herein is employed to include any type or form of power-driven vehicle.

While there is shown and described with particularity one embodiment of the invention, it is to be understood that the invention is not confined to such illustrated embodiment as it contemplates and includes in a four wheel braking mechanism, means for releasing the front or steering wheels independent of the means for simultaneously applying and releasing the four brakes of the car, and means coming within the definition given are intended to be embraced within the scope of the invention sought to be protected.

Having described the invention and set forth its merits, what I claim is:—

1. In a four wheel braking mechanism including means for simultaneously applying or releasing the brakes of the four wheels, means for releasing the brakes of the steering wheels independent of the means for simultaneously applying and releasing the brakes of the four wheels.

2. In a four wheel braking mechanism; means for releasing the brakes of the steering wheels independent of the means for applying and releasing the brakes of the four wheels, and means connecting the steering wheel braking means with the clutch drive of the car.

3. A braking mechanism for the wheels of a motor-driven vehicle including the steering wheels, comprising means for applying the brakes of the several wheels, and other means associated with the steering wheel brakes operable independently of the first-mentioned brake applying means for releasing the steering wheel brakes without affecting said first-mentioned brake applying means.

4. A braking mechanism comprising a brake for the steering wheels of a motor-driven vehicle, means for applying the steering wheel brake, and independent means for releasing said brake without affecting said first mentioned brake applying means.

5. A braking mechanism comprising a brake for the steering wheels of a motor-driven vehicle, means for applying the steering wheel brake, a cam and means for operating the cam to cause the cam to release the steering wheel brake independently of the first mentioned brake applying means.

6. A braking mechanism comprising a brake for the steering wheels of a motor-driven vehicle, means for applying the steering wheel brake, and means associated with said brakes and operable independently of the first mentioned brake applying means for releasing the brakes independently of said first mentioned brake applying means.

7. A braking mechanism for the wheels of a motor-driven vehicle including the steering wheels, comprising means for applying the brakes of the several wheels, other means associated with the steering wheel brakes operable independently of the first-mentioned brake applying means for releasing the steering wheel brakes without affecting said first-mentioned brake-applying means, and means connecting said brake releasing means with the clutch drive of the vehicle for actuating the brake releasing means from said clutch drive.

8. A braking mechanism comprising a brake for the steering wheels of a motor-driven vehicle, means for applying the steering wheel brake, means operable independently of the first mentioned brake applying means for releasing the brakes, means connecting the brake releasing means with the clutch of the gear-drive of the vehicle for actuating the brake releasing means, and resilient means for restoring the brake releasing means to normal position.

9. A braking mechanism comprising a brake for the steering wheels of a motor-driven vehicle, said brake comprising plural separable members, means disposed between adjacent ends of the members for spreading the members to apply the brake, cams disposed between the other ends of the members and constituting a fulcrum for said members, and means for moving said fulcrum relatively to the fulcrumed ends of the members to release the brake independently of the first mentioned brake applying means.

In testimony whereof I affix my signature.

GLENN R. HOFFMAN.